J. S. DOAK.
WINDMILL.
APPLICATION FILED MAY 23, 1916.
1,231,242.
Patented June 26, 1917.
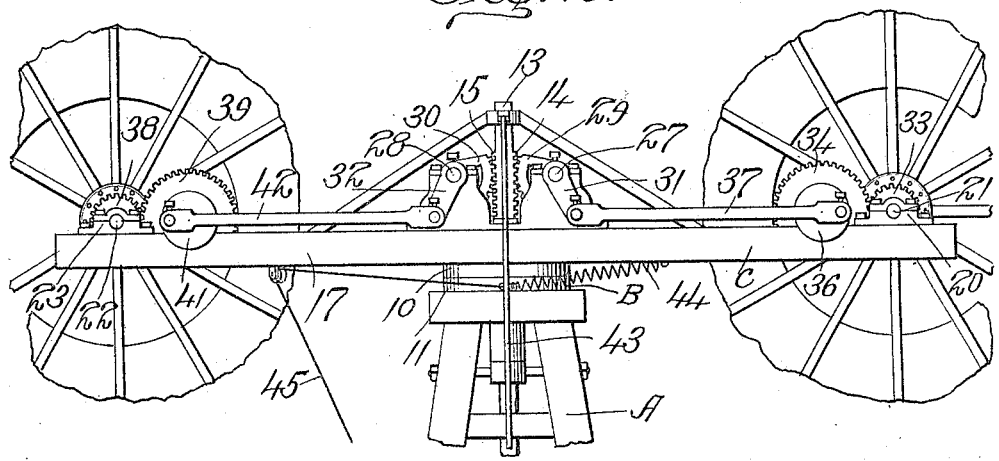

UNITED STATES PATENT OFFICE.

JAMES S. DOAK, OF DEMING, NEW MEXICO.

WINDMILL.

1,231,242.

Specification of Letters Patent. Patented June 26, 1917.

Application filed May 23, 1916. Serial No. 99,339.

*To all whom it may concern:*

Be it known that I, JAMES S. DOAK, a citizen of the United States, residing at Deming, in the county of Luna, State of New Mexico, have invented certain new and useful Improvements in Windmills; and I do hereby declare the following to be a full, clear, and exact description of the invention, such as will enable others skilled in the art to which it appertains to make and use the same.

This invention relates to windmills and particularly those of the double wheel type.

The object of the invention is to provide a windmill of the type named embodying an improved construction whereby the gearing of the mills will be properly balanced and side draft eliminated, the life of the mill being thereby prolonged and its efficiency enhanced.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a windmill constructed in accordance with the invention, the tower being omitted;

Fig. 2, a rear view of the windmill, the top of the tower being shown;

Fig. 3 is a side view of what is shown in Fig. 2.

Fig. 4, a section through the turn table, and

Fig. 5 is a detail view of the connections between the wind-wheels and pump rod.

Referring to the drawings A indicates the tower of the improved windmill and B the turn table embodying upper and lower elements 10 and 11 between which are interposed roller bearings 12. The windmill rod is indicated at 13 and same is mounted to reciprocate in the tower A in the usual manner. The upper end of the rod 13 is provided with oppositely disposed racks 14 and 15. Mounted on the turn table B for movement with the element 10 is a frame C which includes front and rear members 16 and 17 and end members 18 and 19. Rotatably mounted in bearings 20 on the members 16 and 17 adjacent the end member 19 is a shaft 21, while another shaft 22 is correspondingly mounted in bearings 23 adjacent the end member 18. Fixed on the shafts 21 and 22 respectively are wind-wheels 24 and 25 each including vanes 26. The vanes on the wheel 24 are arranged oppositely to the vanes on the wheels 25 so that said wheels will be rotated in opposite directions. Rotatably mounted in suitable bearings on the frame C on either side of the rod 13 are shafts 27 and 28 and fixed on these shafts are segmental gears 29 and 30 respectively which coöperate with the racks 14 and 15. Fixed on the rear ends of the shafts 27 and 28 are arms 31 and 32 respectively the purpose of which will presently appear. Fixed on the shaft 21 are gears 33 which mesh respectively with gears 34 fixed on a shaft 35 journaled in suitable bearings on the members 16 and 17. Also fixed on the shaft 35 adjacent the outer face of the member 17 is a disk 36 to which is attached eccentrically one end of a pitman 37, the other end of said pitman being pivoted to the arm 31. Likewise there is fixed on the shaft 22 gears 38 which mesh respectively with gears 39 fixed on a shaft 40 journaled in suitable bearings on the members 16 and 17. Also fixed on the shaft 40 is a disk 41 and connected to this disk eccentrically of the latter is one end of a pitman 42, the other end of said pitman being pivotally connected to the arm 32. By this construction it will be obvious that as the wheels 24 and 25 are rotated by the wind the shafts 27 and 28 will be oscillated as will likewise the gears 29 and 30. This oscillation of said gears operating through the racks 14 and 15 will effect the desired reciprocation of the rod 13 without any side draft being present. Pivoted to the frame C is a rudder 43 which is normally held in active position by a spring 44. A cable 45 is connected to the rudder 43 at one end and then trained down the tower A so that by pulling the cable the rudder can be moved to inactive position against the influence of the spring 44.

What is claimed is:—

1. In a windmill structure, the combination of a tower, a frame rotatably mounted on said tower, a windmill rod mounted for reciprocation in the tower, oppositely disposed racks on said rod at the upper end of the latter, shafts rotatably mounted on the frame on either side of the rod, gears fixed on said shafts respectively and meshing with respective racks, a pair of wind-wheels mounted on the frame, and connections between said wheels and respective shafts whereby the rotation of the wheels in opposite directions will oscillate said gears to reciprocate the rod.

2. In a windmill structure, the combination of a tower, a frame rotatably mounted on said tower, a windmill rod mounted for reciprocation in the tower, oppositely disposed racks on said rod at the upper end of the latter, shafts rotatably mounted on the frame on either side of the rod, gears fixed on said shafts respectively and meshing with respective racks, arms fixed on said shafts respectively, a pair of disks rotatably mounted on said frame on either side of the rod, pitmen connected to said disks eccentrically and to respective of the latter respectively and to respective arms, a pair of wind-wheels mounted on said frame, and connections between said wind-wheels and respective disks.

In testimony whereof, I affix my signature, in the presence of two witnesses.

JAMES S. DOAK.

Witnesses:
DAVID F. WEATHEREL,
ARTHUR A. DOUGLASS.